United States Patent
Tamura et al.

(10) Patent No.: US 8,371,186 B2
(45) Date of Patent: Feb. 12, 2013

(54) SUPPORTING STRUCTURE OF SHAFT, AND REDUCTION GEAR

(75) Inventors: Mitsuhiro Tamura, Obu (JP); Akira Yamamoto, Obu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 710 days.

(21) Appl. No.: 12/565,198

(22) Filed: Sep. 23, 2009

(65) Prior Publication Data

US 2010/0080498 A1 Apr. 1, 2010

(30) Foreign Application Priority Data

Sep. 29, 2008 (JP) ................................. 2008-251745

(51) Int. Cl.
*F16H 1/14* (2006.01)
(52) U.S. Cl. ........................ 74/417; 74/606 R; 384/585
(58) Field of Classification Search ................. 74/416, 74/417, 606 R; 384/585
See application file for complete search history.

(56) References Cited

U.S. PATENT DOCUMENTS

| | | | | | |
|---|---|---|---|---|---|
| 3,112,965 | A | * | 12/1963 | Popiel | 384/585 |
| 3,747,196 | A | * | 7/1973 | Whittington | 29/898.01 |
| 4,174,013 | A | * | 11/1979 | Yago | 180/6.2 |
| 4,766,777 | A | * | 8/1988 | Hartz et al. | 74/606 R |
| 4,990,000 | A | * | 2/1991 | Harsdorff | 384/542 |
| 4,998,830 | A | * | 3/1991 | Tounai et al. | 384/563 |
| 5,044,228 | A | * | 9/1991 | Rugraff | 74/606 R |
| 5,174,661 | A | * | 12/1992 | Nicolas et al. | 384/538 |
| 5,489,156 | A | * | 2/1996 | Martinie | 384/538 |
| 2005/0188784 | A1 | * | 9/2005 | Knox et al. | 74/606 R |

FOREIGN PATENT DOCUMENTS

| | | |
|---|---|---|
| CN | 1676972 A | 10/2005 |
| JP | 2001-323968 | 11/2001 |
| JP | 2004162868 | 6/2004 |
| KR | 10-0752510 B1 | 8/2007 |

* cited by examiner

*Primary Examiner* — David M Fenstermacher
(74) *Attorney, Agent, or Firm* — Squire Sanders (US) LLP

(57) ABSTRACT

A supporting structure includes a casing, a bearing having an inner ring, an outer ring, and rolling elements disposed between the inner ring and the outer ring, and an attachment member which detachably and directly attaches a shaft to the inner ring. The outer ring is supported by the casing, and the shaft is adapted to be able to be directly fixed to or removed from the inner ring by the attachment member in a state where the bearing is assembled to the casing.

6 Claims, 3 Drawing Sheets

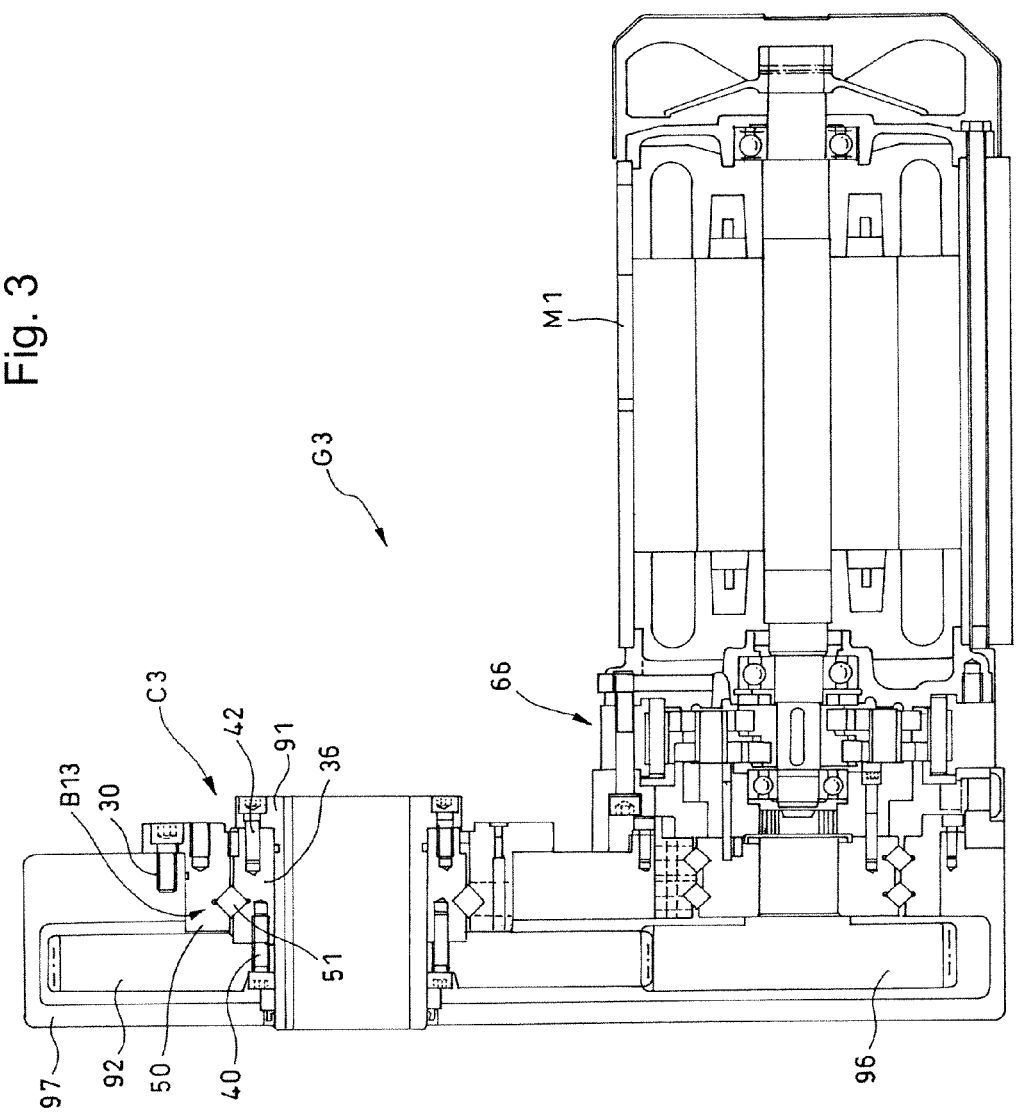

SUPPORTING STRUCTURE OF SHAFT, AND REDUCTION GEAR

BACKGROUND OF THE INVENTION

1. Field of the Invention

The present invention relates to a supporting structure of a shaft, and a reduction gear to which the supporting structure of a shaft is applied.

Priority is claimed on Japanese Patent Application No. 2008-251745, filed Sep. 29, 2008, the content of which is incorporated herein by reference.

2. Description of Related Art

A reduction gear which has a two-stage speed reduction mechanism in a casing is disclosed in Japanese Unexamined Patent Application Publication No. 2001-323968. In this disclosed example, an inscribed meshing planetary gear speed reduction mechanism is used for the first stage of the speed reduction mechanism, and a bevel speed reduction mechanism is used for the subsequent stage. In the bevel pinion and the bevel gear which constitute the bevel speed reduction mechanism at the subsequent stage, the bevel gear functions as an output gear. An output shaft which supports the output gear is supported by a casing via a bearing. A hollow shaft which has a hollow portion is used as the output shaft.

The reduction gear which has a hollow shaft type output shaft is attached to a partner machine by directly fitting the output shaft into the driving shaft of the partner machine.

In the case of the speed reducer which has the hollow shaft type output shaft as described above, a request for changing the diameter of a hollow portion according to the external diameter of a driving shaft of the partner machine to which the speed reducer is to be attached may occur.

Further, for example, when a structure in which an output shaft is connected with a partner machine by using a joint is adopted, a request for changing the output shaft into a solid output shaft with a key groove may occur. In such a case, since it is not necessary at all to change any portions other than the output shaft of the speed reducer, only the output shaft will be rearranged. However, the supporting structure of the conventional output shaft includes the structure disclosed in Japanese Unexamined Patent Application Publication No. 2001-323968, and the output shaft cannot be rearranged unless portions including a bearing which supports the output shaft are disassembled.

SUMMARY OF THE INVENTION

It is desirable to allow easy replacement in a structure which supports a shaft which is expected to be replaced.

According to an embodiment of the invention, there is provided a supporting structure of a shaft of a reduction gear having a speed reduction mechanism in a casing, and including a shaft which supports a gear which constitutes the speed reduction mechanism. The supporting structure includes a bearing having an inner ring, an outer ring, and rolling elements disposed between the inner ring and the outer ring, and supporting the shaft, and an attachment member which detachably and directly attaches the shaft to the inner ring. The outer ring is supported by the casing. The attachment member is adapted to be able to directly attach the shaft to the inner ring in a state where the bearing is assembled to the casing, and remove the shaft from the inner ring in a state where the bearing is assembled to the casing.

In the embodiment of the invention, attachment and removal of a shaft to be supported are performed on the inner ring by the attachment member in a state where a bearing (an inner ring, an outer ring, and rolling elements) which supports the shaft is attached to the casing.

Accordingly, the shaft in the reduction gear can be very simply replaced, for example, by preparing a plurality of shafts to be replaced.

According to the embodiment of the invention, the shaft to be replaced can be easily replaced on its own and the range of applications or other uses of the reduction gear can be simply extended.

BRIEF DESCRIPTION OF THE DRAWINGS

FIG. 3 is a sectional view of a speed reducer according to a third embodiment of the invention.

DETAILED DESCRIPTION OF THE INVENTION

Hereinafter, an embodiment of the invention will be described in detail with reference to the drawings.

Figure 1:
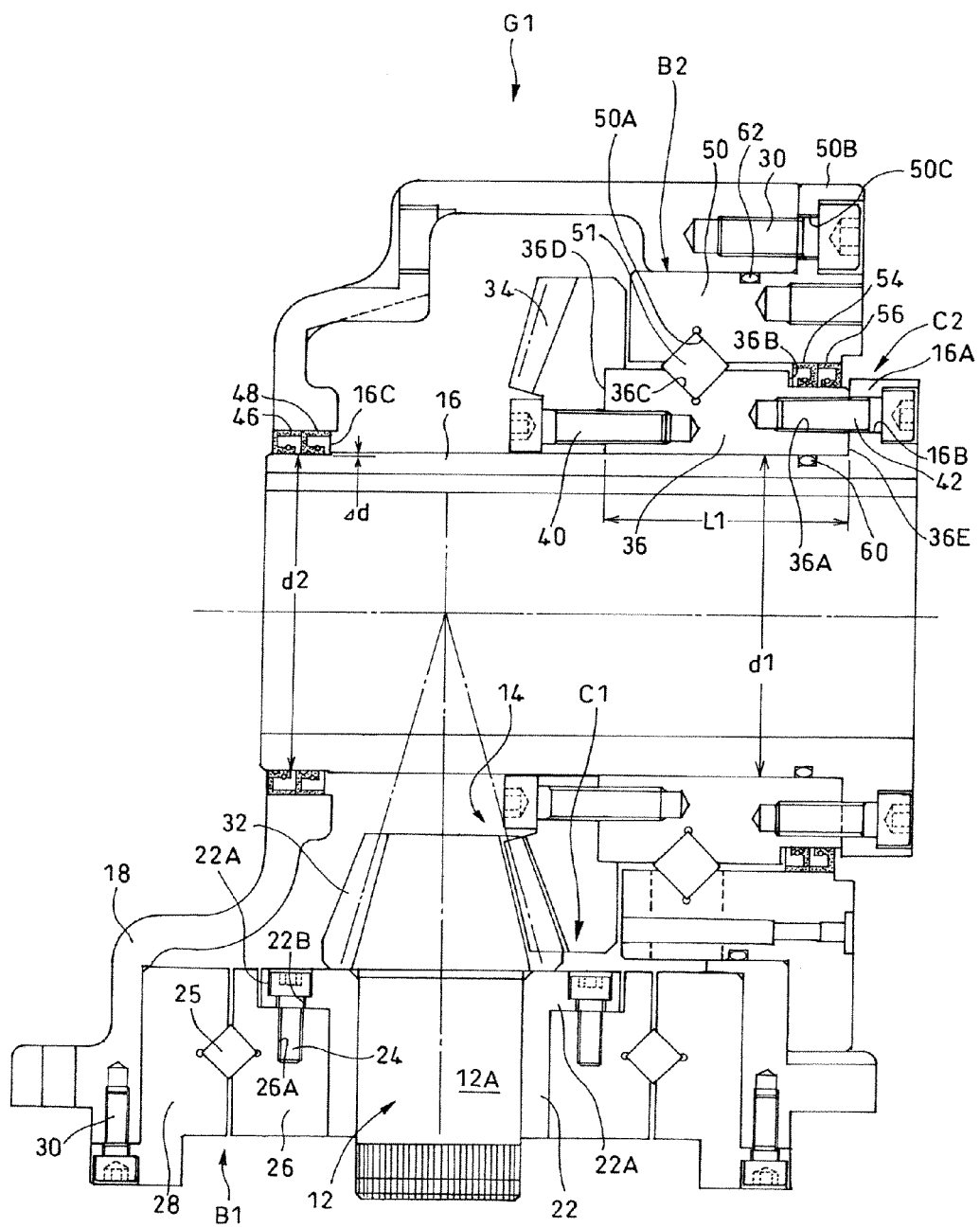
FIG. 1 is a sectional view of a speed reducer according to a first embodiment of the invention.

FIG. 1 is a sectional view of a speed reducer to which an example of a supporting structure of a shaft according to the invention has been applied. The reduction gear G1 includes an input shaft 12, an output shaft 16, a speed reduction mechanism 14 which includes the input shaft 12 and the output shaft 16 and reduces the rotational speed of the input shaft 12, a casing 18, a bearing 20, and first and second attachment/detachment means (attachment members) C1 and C2.

The input shaft 12 is connected with a motor (whose illustration is omitted) or the like via a connector which is not shown. The input shaft 12 is integrated with an input flange 22 by press fitting. A flange portion 22A of the input flange 22 is fixed to an inner ring 26 of a first bearing B1 via a bolt 24. The first bearing B1 is a so-called cross-roller bearing, and an outer ring 28 is fixed to the casing 18 via a bolt 30. The input shaft 12 is rotatably supported by the casing 18 in the state where it is positioned in the radial direction and the axial direction via the inner ring 26, cross-rollers (rolling elements) 25, and the outer ring 28 of the first bearing B1. In this embodiment, the cross-rollers 25 of the first bearing B1 are constituted by a plurality of cylinders (rollers) with equal diameter and height. The respective cross-rollers 25 are incorporated in a state where the rotational axes thereof are alternately changed 90° via pockets (not shown) provided in the radial direction of the outer ring 28.

In this embodiment, first, the invention is applied to the input shaft 12. That is, the input shaft 12 is composed of a pinion shaft 12A formed with a pinion 32, and the input flange 22 formed with the flange portion 22A and integrated with the pinion shaft 12A by press fitting. The input flange 22 is fixed to the inner ring 26 of the first bearing B1 via the bolt 24. That is, the attachment/detachment means C1 is constituted by the flange portion 22A of the input flange 22 integrally incorporated into the input shaft 12, a bolt insertion hole 22B formed so as to pass through the flange portion 22A in the axial direction, the bolt 24 inserted into the bolt insertion hole 22B parallel to the input shaft 12, and a bolt hole 26A of the inner ring 26 into which the bolt 24 is threaded.

The speed reduction mechanism 14 includes a bevel pinion 32 directly formed at the tip of the input shaft 12, and a bevel gear 34 which meshes with the bevel pinion 32, and reduces the rotational speed of the input shaft 12 to transmit the reduced speed to the output shaft 16. The bevel gear 34 is directly fixed via the bolt 40 to the axial inside of an inner ring 36 of a second bearing B2 to be described next. The rotation of the input shaft 12 is transmitted to the inner ring 36 of the second bearing B2 after the rotational direction of the input shaft has been changed at a right angle and the speed thereof has been reduced, by the bevel pinion 32 and the bevel gear 34.

The output shaft 16 is supported by the second bearing B2 serving as an output shaft bearing. The second bearing B2 is a cross-roller bearing disposed in one axial place of the output shaft 16, and is composed mainly of the inner ring 36, an outer ring 50, and cross-rollers (rolling elements) 51 disposed between the inner ring 36 and the outer ring 50.

The bevel gear 34 is connected with an axial end 36D of the inner ring 36 of the second bearing B2 via a bolt 40, and the output shaft 16 is fixed (attached) (which will be described later) to an axial end 36E via a second attachment/detachment means C2 according to the invention. A stepped portion 36B is formed at an outer periphery of an axial end of the inner ring 36, and two oil seals 54 and 56 which seal between the inner ring 36 and the outer ring 50 are juxtaposed adjacent to the stepped portion 36B. An inner-ring-side V-groove 36C with an angle of 90° is bored at the outer periphery of the inner ring 36. The inner ring 36 is adapted to have a wide dimension with an axial length L1 sufficiently exceeding the radius (d1/2) of the output shaft 16. In addition, since the output shaft 16 is fitted into the inner ring 36 by clearance fitting (not press fitting), ease of extraction (ease of replacement) is secured.

The outer ring 50 of the second bearing B2 is connected with and supported by the casing 18 via the bolt 30. That is, a flange portion 50B is formed at an axial end of the outer ring 50 so as to protrude in the radial direction therefrom. The casing 18 and the outer ring 50 are connected together by inserting the bolt 30 parallel to the output shaft 16 from a bolt insertion hole 50C which is formed to pass through the flange portion 50B in the axial direction of the output shaft. An outer-ring-side V-groove 50A with an angle of 90° is bored at the inner periphery of the outer ring 50.

In this embodiment, the cross-rollers (rolling elements) 51 of the second bearing B2 are constituted by a plurality of cylinders (rollers) with equal diameter and height. The respective cross-rollers 51 are incorporated in a state where the rotational axes thereof are alternately changed 90° between the inner-ring-side V-groove 36C and the outer-ring-side V-groove 50A via pockets (not shown) provided in the radial direction of the outer ring 50.

In this embodiment, the second attachment/detachment means C2 is constituted by the flange portion 16A formed at the axial end of the output shaft 16 so as to protrude in the radial direction therefrom, a bolt insertion hole 16B at the flange portion 16A so as to pass therethrough in the axial direction, a bolt 42 inserted into the bolt insertion hole 16B parallel to the output shaft 16, and a bolt hole 36A of the inner ring 36 into which the bolt 42 is threaded. That is, the output shaft 16 is attached to the inner ring 36 by inserting the bolt 42 from the bolt insertion hole 16B of the flange portion 16A, and threading the bolt 42 into the bolt hole 36A of the inner ring 36.

In addition, a stepped portion 16C is formed at the other axial end of the output shaft 16, and two oil seals 46 and 48 which seal between the output shaft 16 and the casing 18 are juxtaposed adjacent to the stepped portion 16C. The external diameter of the portion of the output shaft 16 which faces the inner ring 36 is d1, and the external diameter of the output shaft nearer to an end than the stepped portion 16C is d2. The external diameter d2 is smaller than the external diameter d1 by Δd.

In addition, reference numeral 60 represents an O ring which seals between the inner ring 36 of the second bearing B2 and the output shaft 16, and reference numeral 62 represents an O ring which seals between the outer ring 50 of the second bearing B2, and the casing 18.

Next, the operation of the reduction gear G1 is described.

When the input shaft 12 rotates, the bevel pinion 32 directly formed at the tip of the input shaft 12 rotates, and the bevel gear 34 which meshes with the bevel pinion 32 rotates at a reduced speed. Since the bevel gear 34 is fixed to the inner ring 36 of the second bearing B2 via the bolt 40, the inner ring 36 rotates at the same rotational speed as the bevel gear 34. On the other hand, since the inner ring 36 is fixed to the output shaft 16 via the second attachment/detachment means C2, the rotation of the bevel gear 34 is transmitted to the output shaft 16 as it is.

Here, when the output shaft 16 is replaced, the bolt 42 of the second attachment/detachment means C2 is removed, and the output shaft 16 is pulled out rightward along the axial direction of FIG. 1. Simply by performing this operation, the output shaft 16 can be removed from the inner ring 36 in a state where the inner ring 36, the outer ring 50, and the cross-rollers 51 of the second bearing B2, and the bevel gear 34 which exists axially inside the inner ring 36 are assembled to the casing 18.

The second bearing B2 is a so-called cross-roller, and should be assembled by inserting individual cross-rollers (rolling elements) 51 through pockets provided in the outer ring 50 while the directions thereof are alternately changed. Therefore, reassembling is not easy if the second bearing is disassembled once. For this reason, the fact that the output shaft 16 can be removed from and reattached to the inner ring 36 in a state where the inner ring 36, the outer ring 50, and the cross-rollers 51 of the second bearing B2, and the bevel gear 34 which exists axially inside the inner ring 36 via the inner ring 36 are assembled to the casing 18 has great merit in terms of carrying out replacement work on the output shaft 16.

In this case, the input shaft 12 can be pulled out from the pinion side by removing the bolt 24 while the inner ring 84, the rollers 86, and the outer ring 87 of the first bearing B1 which supports the input shaft 12 have been assembled to the casing 18. Accordingly, for example, when the output shaft 16 has already been removed in this way, the input shaft 12 can be removed without disassembling the first bearing B1 having the cross-roller structure which is very difficult to reassemble at all. In this embodiment, since the output shaft 16 can be simply removed, it is also easy to change the reduction ratio of the speed reduction mechanism 14, for example, by replacing the bevel pinion 32 and the bevel gear 34 in a set. Since the input shaft 12 or the output shaft 16 is supported by only one first bearing B1 or B2, the attachment or removal of the input shaft 12 or the output shaft 16 is easy.

If only the external diameter d1 of the portion of the output shaft 16 (portion corresponding to the axial length L1) which abuts on the flange portion 16A, the bolt insertion hole 16B, and the inner ring 36 of the second bearing B2 is the same, the type of the output shaft (16) to be replaced regarding whether the output shaft is solid or hollow, the external diameter of a portion which protrudes from the casing 18, the diameter of a hollow portion, a protruding length, or the like may differ.

Also, simply by placing a new output shaft (16) with different dimensions, shape, or the like into the inner ring 36 while the second bearing B2 and the bevel gear 34 have been assembled to the casing, thereby making the flange portion 16A abut on the axial end 36E of the inner ring 36, and inserting the bolt 42 of the second attachment/detachment means C2 through the bolt insertion hole 16B and threading the bolt into the bolt hole 36A of the inner ring 36, the fixation of the new output shaft (16) to the inner ring 36 can be completed, and be supported by the second bearing B2 as it is.

In addition, in this embodiment, the stepped portion 16C is formed at one end of the output shaft 16, and the external diameter d2 of the output shaft on the side of the end is made smaller than the external diameter d1 of the portion of the output shaft which abuts on the inner ring 36 by Δd. Therefore, even if there is almost no difference between the internal diameter of the inner ring 36, and the external diameter d1 of the portion of the output shaft 16 which abuts on the inner ring 36, inserting the output shaft 16 into the inner ring 36 is easy.

This means that it is preferable that the new output shaft (16) to be replaced be made into a shape having such a stepped portion (16C). As a result, the inner ring 36 and the output shaft 16 can be stably rotated as one large lump while setting the inner ring 36 to a "wide" shape having the axial length L1, and the output shaft 16 can be supported by only one inner ring 36.

Figure 2:
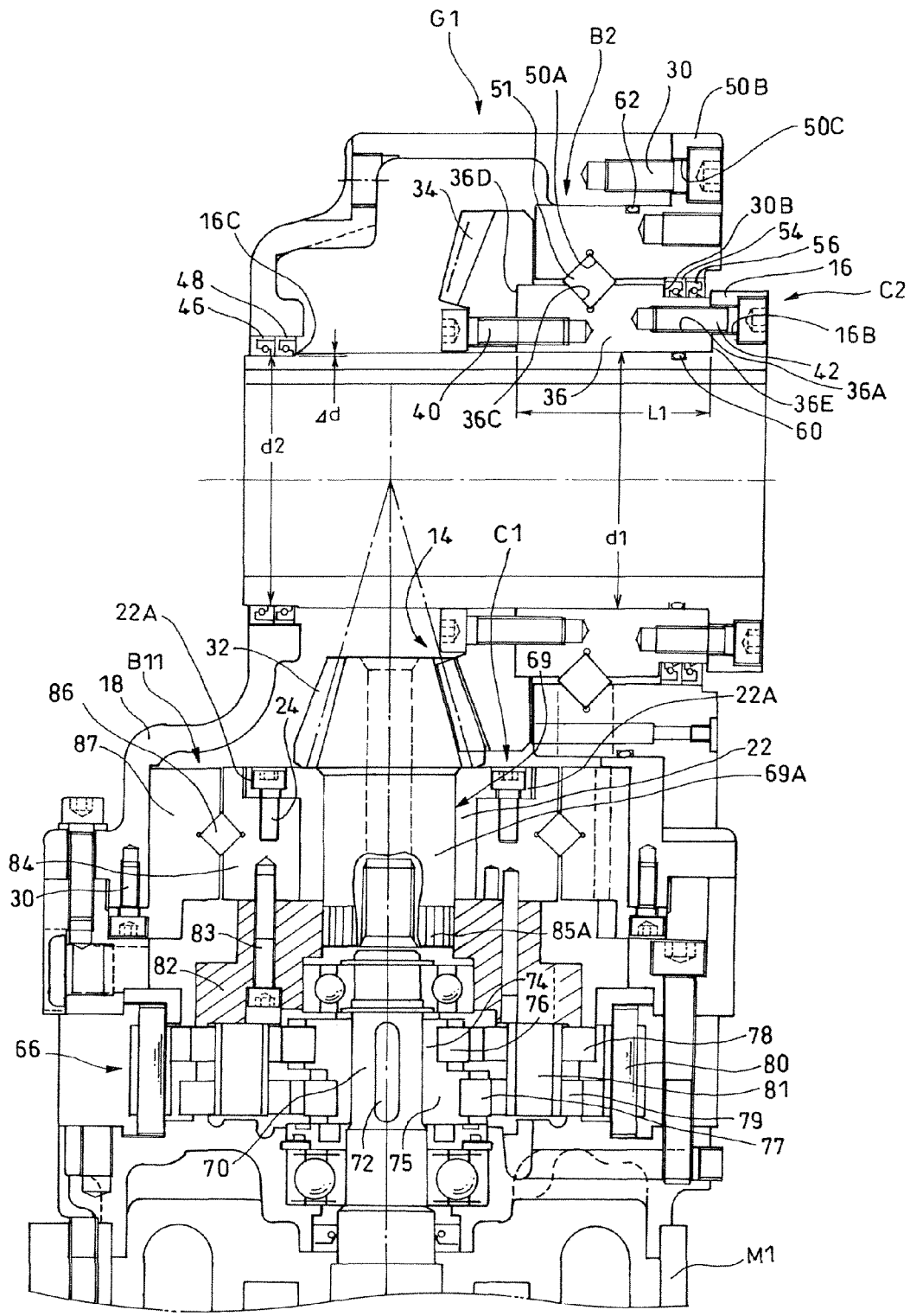
FIG. 2 is a sectional view of a speed reducer according to a second embodiment of the invention.

An example of another embodiment of the invention is shown in FIG. 2.

This embodiment is different from the foregoing embodiment in that a speed reduction mechanism 66 of an inscribed meshing planetary gear structure is attached to a preceding stage of the foregoing speed reduction mechanism 14, the reduction gear G2 having a significantly high reduction ratio is used, and the speed reduction mechanism 66 is driven by a motor M1.

The speed reduction mechanism 66 of the inscribed meshing planetary gear structure at the preceding stage includes eccentric bodies 74 and 75 incorporated into the outer periphery of a motor shaft 70 of the motor M1 via a key 72, external gears 78 and 79 rockably and rotatably incorporated into the outer peripheries of the eccentric bodies 74 and 75 via rollers 76 and 77, and an internal gear 80 with which the external gears 78 and 79 internally mesh. The external gears 78 and 79 and the internal gear 80 have a slight difference in the number of teeth of, for example, about one to four. When the eccentric bodies 74 and 75 are rotated by the rotation of the motor shaft 70, the external gears 78 and 79 are guided by the outer peripheries of the eccentric bodies 74 and 75 (via the rollers 76 and 77), and rockingly rotate while being inscribed in the internal gear 80. As a result, the relative rotation resulting from a difference in the number of teeth occurs between the internal gear 80 and the external gears 78 and 79. This relative rotation component is transmitted to a carrier 82, which is equivalent to the output shaft of the speed reduction mechanism 66, via an inner pin 81.

The carrier 82 is directly fixed to the inner ring 84 of the first bearing B11 via a bolt 83.

The supporting structure of the input shaft 69 of the speed reduction mechanism 14 is almost the same as that of the aforementioned configuration. The input shaft 12 is supported by the inner ring 84 of one first bearing B11. Since the input shaft 69 is supported by only one first bearing B11, the attachment or removal of the input shaft 69 is easy. The first bearing B11 is a cross-roller bearing composed of the inner ring 84, the rollers 86, and the outer ring 87. In addition, the rollers 86 are adapted such that the angle of the rotational axis of each thereof is changed 90°, and are incorporated one by one through pockets (not shown) provided in the outer ring 87.

Even in this embodiment, the input shaft 69 is incorporated using the first attachment/detachment means C1 similar to the earlier embodiment. That is, the input shaft 69 is composed of a pinion shaft 69A formed with a pinion 32, and the input flange 22 formed with the flange portion 22A and integrated with the pinion shaft 69A. The input flange 22 is fixed to the first bearing B11 via the bolt 24.

That is, the input shaft 69 can be pulled out from the pinion side by removing the bolt 24 while the inner ring 84, the rollers 86, and the outer ring 87 of the first bearing B11 which supports the input shaft 69 have been assembled to the casing 18. Accordingly, for example, when the output shaft 16 has already been removed, the input shaft 69 can be removed without disassembling the first bearing B11 of the cross-roller structure which is very difficult to reassemble at all. Even in this embodiment, since the output shaft 16 can be simply removed similarly to the aforementioned embodiment, it is easy to replace the bevel pinion 32 and the bevel gear 34 in a set, and it is also easy to change the reduction ratio of the speed reduction mechanism 14. Further, since the output shaft can be pulled out toward the speed reducer at the preceding stage, assembly and removal are also easy.

In addition, as for the input shaft 69, a configuration in which a knurling coupling 85A is used as the portion of a spline 85, and the input shaft 69 is press-fitted into the inner ring 84 is adopted. This can further increase the rotational rigidity of the input shaft 69.

Since the other configurations are the same as those of the earlier embodiment, the same reference numerals as the earlier embodiment are given to the parts which are the same or functionally similar in the drawing, and duplicate description is omitted.

As is apparent from the fact that the invention is applied to different reduction gears in the first and second embodiments, the configuration of a basic speed reduction mechanism of the reduction gear is not particularly limited in the invention.

For example, as shown in FIG. 3, even in a configuration in which a spur gear 92 is attached to an output shaft 91 of the reduction gear G3, the output shaft 91 can be replaced by completely the same configuration, only by the screwing or removal of the bolt 42 in a third attachment/detachment means (attachment member) C3.

In this embodiment, the speed reduction mechanism 66 of the inscribed meshing planetary gear structure which has already been described is connected to the motor M1, and a spur gear 96 which is an input shaft of the speed reduction mechanism 14, and the spur gear 92 are connected to an output portion of the motor. Since the output shaft 91 is a hollow shaft, and has the same supporting structure as the earlier embodiment, the output shaft can be fixed or removed in a state where the inner ring 36, the outer ring 50, and the cross-roller (rolling elements) 51 of the second bearing B13 are incorporated into the casing 97 by the function of the third attachment/detachment means C3.

In addition, in the invention, the concrete configuration of the attachment/detachment means has only to be a "configuration in which a shaft is directly fixed to an inner ring, and the shaft is removed from the inner ring in a state where the inner ring, an outer ring, and rolling elements of a bearing are assembled to a casing", and but the invention is not particularly limited to the above example.

For example, beneficial effects are obtained when the invention is applied to a speed reducer or a geared motor which has a shaft which is expected to be replaced, such as a hollow output shaft.

It should be understood that the invention is not limited to the above-described embodiment, but may be modified into various forms on the basis of the spirit of the invention. Additionally, the modifications are included in the scope of the invention.

We claim:

1. A supporting structure of a shaft of a reduction gear having a speed reduction mechanism in a casing, and including a shaft which supports a gear which constitutes the speed reduction mechanism, the supporting structure comprising:
 a bearing having an inner ring, an outer ring, and rolling elements disposed between the inner ring and the outer ring, and supporting the shaft, and
 an attachment member which detachably and directly attaches the shaft in a fixed manner to the inner ring,
 wherein the outer ring is supported by the casing,
 wherein the attachment member is adapted to be able to directly attach the shaft to the inner ring in a state where the bearing is assembled to the casing, and remove the shaft from the inner ring in a state where the bearing is assembled to the casing, and
 wherein the shaft is fitted into the inner ring by clearance fitting.

2. The supporting structure of a shaft of a reduction gear according to claim 1,
 wherein a gear to rotate along with the shaft is fixed to the inner ring, and the attachment member is adapted to be able to remove the shaft from the inner ring in a state where the gear is assembled to the inner ring.

3. The supporting structure of a shaft of a reduction gear according to claim 1,
 wherein the attachment member has a flange portion formed so as to protrude in a radial direction of the shaft, a bolt insertion hole formed in the flange portion so as to pass therethrough in an axial direction, a bolt inserted into the bolt insertion hole, and a bolt hole of the inner ring into which the bolt is threaded.

4. The supporting structure of a shaft of a reduction gear according to claim 1,
 wherein the bearing supports the shaft by a single inner ring.

5. A reduction gear in which the speed reduction mechanism includes an input shaft and an output shaft, and the supporting structure of a shaft according to claim 1 is applied to at least one of the input shaft or the output shaft.

6. The reduction gear according to claim 5,
 wherein the input shaft has a pinion shaft formed with a pinion, and an input flange formed with a flange portion and integrated with the pinion shaft.

* * * * *